Figure 1:
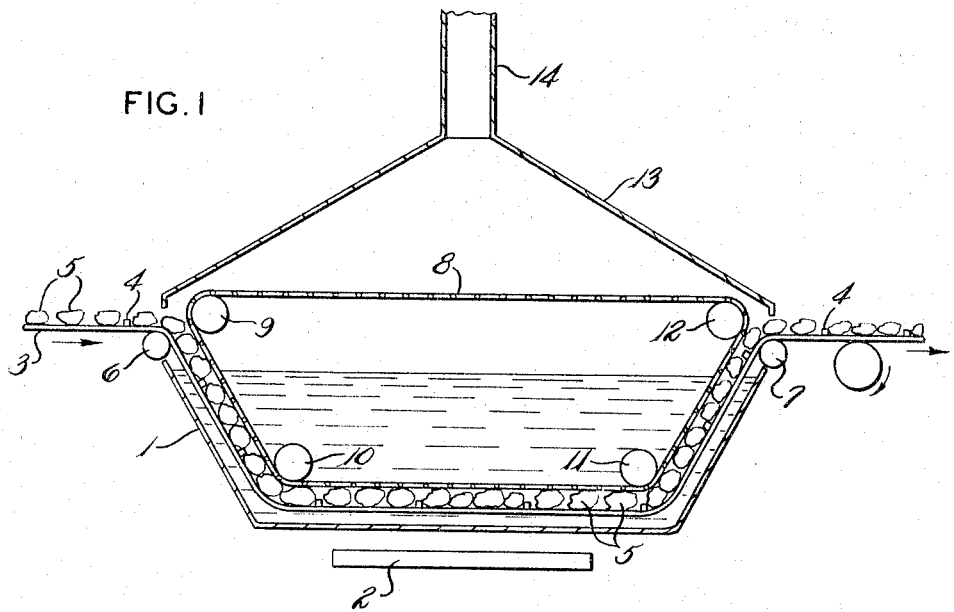

May 9, 1967  J. A. BEVERLY  3,318,838
METHOD OF RECLAIMING AND TREATING SYNTHETIC RUBBERS
Filed March 5, 1964

INVENTOR.
JAMES A. BEVERLY
BY Oldham & Oldham
ATTYS.

United States Patent Office 3,318,838
Patented May 9, 1967

3,318,838
METHOD OF RECLAIMING AND TREATING SYNTHETIC RUBBERS
James A. Beverly, 1394 Garman Road, Akron, Ohio 44313
Filed Mar. 5, 1964, Ser. No. 349,551
10 Claims. (Cl. 260—33.6)

The present invention relates to a novel and improved method of reclaiming and/or treating synthetic rubbers, and especially to a method of treating a synthetic rubber that has been polymerized in an aqueous medium to remove water therefrom.

In the production of some synthetic rubbers, and particularly GRS rubber which is the co-polymer of butadiene and styrene, the polymerization occurs in an aqueous medium so that the solid particles of synthetic rubber produced usually have a large amount of water embedded, or included therein. Such synthetic rubber usually is processed mechanically in various ways and is dried so that the water has been at least substantially completely removed for the rubber to make it available for compounding and use. Some synthetic rubbers are desired to be used in the form of latices in which instance the producer of the synthetic rubber sells a liquid batch of material so that the purchaser, or producer can use such material as a latex and form desired synthetic rubber deposits therefrom. Usually these synthetic rubbers sold in latex form, when deposited or solidified, form relatively tough, special rubber compounds that are specially prepared and/or compounded for individual uses. In making the latices, lumps or masses of coagulum sometimes are formed therein, and such lumps or masses must be strained, or otherwise removed from the latex before it is used or sold. Occasionally some of the synthetic rubber latex may be spilled from the processing equipment and it will then solidify on the floor, on the outside of the apparatus, or in other places where it can be collected and scrapped. Yet another problem that arises in the production of both solid synthetic rubber products, and in synthetic rubber latices is that solid deposits will build up on the processing equipment on the inner surfaces thereof, and such deposits heretofore have been periodically removed and have been considered to be scrap material. One problem with all of these synthetic rubber coagulums, or solid materials obtained in the manners described has been that these rubbers usually are relatively tough, and/or are of a special composition so that they cannot normally be added to normal rubber compounding batches to be used therein. These synthetic rubber particles are springy, and are spongy or porous because of the water embedded therein. Such rubber particles cannot be processed in rubber working apparatus because, among other reasons, the water lubricates the particles and prevents them from blending together.

It is the general object of the present invention to provide a new and improved method of treating, processing, and/or reclaiming synthetic rubbers that have been polymerized in an aqueous medium and contain relatively large amounts of water therein so as to soften the synthetic rubber obtained and drive part of, most of, or all of the moisture therefrom by a simultaneous heating and compounding operation.

Another object of the invention is to treat conventionally produced synthetic rubber masses that are relatively tough or are of a special composition and that have heretofore been considered scrap so as to render such relatively tough, or special composition rubber materials into a softened, or extended rubber product that can be used as a rubber master batch for other rubber compounding actions.

Another specific object of the invention is to process GRS synthetic rubber masses with compounding oils, under elevated temperature conditions, so as to boil, or drive off any water contained in such synthetic rubber masses or particles.

A further specific object of the invention is to process a relatively tough GHS synthetic rubber either by a continuous process, or by a batch process, under non-oxidizing conditions to obtain a usable, softened product therefrom.

The foregoing and other objects and advantages of the invention will be made more apparent as the specification proceeds.

Figure 2:
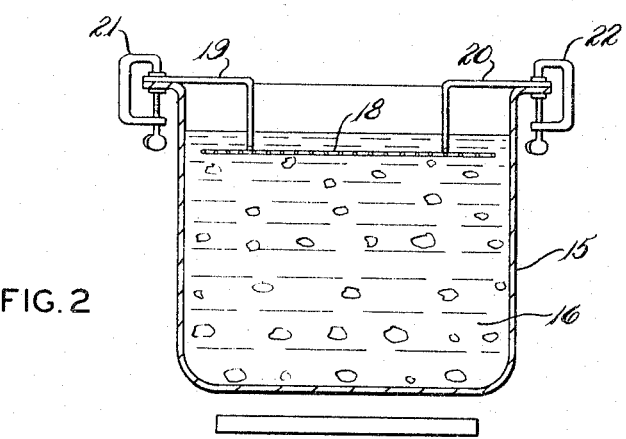

For a better understanding of the invention, attention is directed to the accompanying drawings, wherein:

FIG. 1 is a vertical section through apparatus for practicing one method of processing synthetic rubber in accordance with the principles of the invention; and FIG. 2 is a vertical section through apparatus for practicing a batch-type method of the invention.

When referring to corresponding members shown in the drawings and referred to in the specification, corresponding numerals are used to facilitate comparison therebetween.

One embodiment of the invention, generally speaking, relates to a method for the treatment, or reclaiming of relatively tough synthetic rubbers, particularly those polymerized in an aqueous medium and containing water, so as to remove the water and soften the synthetic rubber and where the method comprises the steps of immersing the synthetic rubber in a compounding oil that is heated to a temperature appreciably above 212° F. to boil off the water from the synthetic rubber and/or to combine some oil with the synthetic rubber to provide to softening thereof, and then removing the synthetic rubber from the heated compounding oil thus producing a softened, usable product.

Attention now is particularly directed to the details of the structure shown in the drawings, and a suitable receiving tank 1 is shown that has a gas, electric, or hot air heater member, or equivalent heating unit 2 provided thereunder so as to heat the contents of the tank 1 to a predetermined, controlled temperature. Preferably, the apparatus of the invention includes means, such as a coveyor 3, that may have a plurality of transversely extending cross ribs, or lugs 4 of any suitable size provided thereon whereby the conveyor or belt 3 can be used to receive and carry a layer, or layers of uneven particles, or masses 5 of synthetic rubber thereon to move them through the tank 1, as hereinafter described.

The drawing clearly shows that the belt or conveyor 3 passes over members, such as guide rolls 6 and 7, where it enters and leaves the tank 1 so that the belt 3 has a controlled passage through the tank, as hereinafter explained. The tank 1 also has a porous guide belt 8 positioned therein, which belt 8 is made, preferably, from an apertured material, such as a wire screen, or the like so that liquid or gases in the tank can freely pass through the belt 8 but with the belt 8 preventing the passage of any of these particles, or masses 5 therethrough. The belt 8 is positioned on a plurality of guide rolls or members 9, 10, 11 and 12 to provide it with controlled courses in the tank 1, and with such courses usually lying adjacent and parallel to marginal portions of the tank 1. The drawing shows that the course followed by the belt 3 in the tank 1 may be controlled through the belt 8 and the masses 5 of synthetic rubber received between the belts 8 and 3, or it may be otherwise conventionally controlled, as desired.

Preferably the tank 1 has some type of a confining hood 13 positioned thereover, and with an exhaust duct 14 extending therefrom and being connected to a conventional member, such as an exhaust fan (not shown) to remove any of the fumes, or vapors arising from contents of the tank 1.

As another feature of the invention, the tank 1 receives a suitable synthetic rubber compounding, or extending oil therein. Commercially available oils, such as those produced and sold by The Shell Oil Company under the trademarks of "Dutrexes" and "Shellflexes," are types of synthetic rubber compounding oils that can be used in the practice of the invention. Similar compounding oils are available from many other companies, including Sun Oil Company, of Philadelphia, Pa. In general, these rubber processing and compounding oils comprise oils that include aromatic carbon atoms or groups, naphthenic carbon atoms or groups, and paraffinic carbon atoms or groups, and is believed that the benefits of the invention can be realized by use of any of such commercially available, known oils. However, specifically, the invention has been practiced very satisfactorily by use of "Shellflex" Oil No. 310, which contains 4% aromatic carbon atoms, 34% naphthenic carbon atoms and 62% paraffinic carbon atoms. Also, Shell "Dutrex" Oil No. 786 has been used satisfactorily and this has 41% carbon atoms, 22% naphthenic carbon atoms and 37% paraffinic carbon atoms. Shell "Dutrex" Oil No. 739 also has been satisfactorily used in the process, and it is understood to have a higher percentage of aromatic carbon atoms than the Shell "Dutrex" Oil No. 786. In general, it is believed that the naphthenic oils are particularly satisfactory for use in the process of the invention, as are the oils containing appreciable quantities of paraffinic carbon atoms. The so-called "aromatic oils" that contain relatively high percentages of aromatic carbon atoms have proven to be very compatible with synthetic rubbers and are satisfactory for using in the process of the invention, but usually such oils are somewhat objectionable because they are expensive. The naphthenic oils are particularly desirable because they are of low cost, but yet are a good all around synthetic rubber compounding oil for softening and/or extending the synthetic rubber.

In practicing the process of the invention, it is preferred to keep the oil received in the tank 1 at a temperature of between about 350° F. to 420° F., but higher temperatures can be used when desirable, as the general types of oils of the invention are not appreciably volatile up until temperatures of, usually above 700° F. are reached. However, any desired temperature that is above 212° F. is satisfactory for use in practice of the invention. By submerging the rubber completely in the oil, oxidation of the rubber is prevented.

In designing the tank 1 and the speed at which the belt 3 is driven, it is preferable that the speed of the belt is such that the rubber masses or particles 5 being processed will be retained in the tank 1 for an interval of about 20 to 30 minutes so that the synthetic rubber can be heated to the desired temperature and be softened by such temperature to facilitate release of the water therein. By such heating, any water contained in the synthetic rubber will be boiled, or driven therefrom and it can pass through the porous belt 8 and be confined by the hood 13 to be drawn from the tank. Heating also facilitates reaction, or combination of the oil with the synthetic rubber to provide a softened, usable synthetic rubber.

When a continuous process like that shown in FIG. 1 is used in practice of the invention, it is necessary to intermittently add new quantities of the compounding oil to the tank 1, and it has been found that about 20% to 40% by weight of compounding oil is required in relation to the weight of the synthetic rubber processed. Thus, oil can be slowly flowed into the tank continuously, or the desired poundage of the oil can be added intermittently dependent upon the poundage of the rubber being processed, or that has been processed since the prior addition of oil to the tank.

It will be realized that the specific type of oil used in the practice of the invention can be selected based upon the properties desired in the synthetic rubber mass obtained as an end product so that for a different end use, different degrees of softness are desired in the rubber, and different poundages of oil are required in the rubber for the various properties desired in the synthetic material produced. The quantity of oil used will also increase with increased toughness of the synthetic rubber starting material. The properties of the treated synthetic rubber hence will be controlled by the type of oil used, the temperature of the treating bath and the time of immersion of the synthetic rubber in the oil.

It will be realized that the apparatus shown in FIG. 1 is for illustrative purposes only, and that any suitable type of apparatus can be used for processing the synthetic rubber. However, it is an important feature of the invention that the synthetic rubber mass processed is completely submerged, or immersed in the compounding oil used so that there is no possibility of any oxidation of the synthetic rubber particles while the water contained therein is being driven therefrom.

It is also within the concept of the invention to place the particles or masses 5 of the synthetic rubber being processed in some type of a heated liquid prior to their deposit upon the belt 3. Thus, the synthetic rubber particles may be immersed, for example, in a bath of compounding oil at an elevated temperature for a few minutes prior to their deposit on the belt for passage through the processing tank of the invention so as to start the softening and heating action thereof. Likewise, the synthetic rubber may be placed in materials that are either compatible or non-compatible with the synthetic rubber to start the heating action thereon, as desired.

It is also within the concept of the invention to practice it as a batch process and thus FIG. 2 shows a treating tank 15 containing a quantity 16 of the compounding oil to be used in treating the scrap synthetic rubber. In this instance, some type of a porous screen, or cover member 18 is provided and it may, for example, be secured below the surface of the oil 16 as by use of positioning or support arms 19 and 20 that in turn are secured to the upper marginal portions of the tank 15, as by use of clamps 21 and 22. It will be realized that the oil in the tank 15 can be heated by an internal heat source, such as steam pipes provided therein, or else an external heat supply may be provided for the tank at the bottom, or side walls thereof, as desired.

While the invention is useful with any scrap synthetic rubber material as commercially made today by polymerization in an aqueous medium, usually with the reactants being emulsified by soap, it is particularly suited for the processing of GRS rubber obtained from a latex of such material and where the rubber was compounded and/or prepared for use in the latex form.

In tests of the invention, it has been found that all, or any part of the moisture in synthetic rubber originally included therein can be driven therefrom by the process of the invention. Likewise, dirt and other foreign material present in the synthetic rubber so as to make it unusable in its prior form will be at least sustantially completely removed by the processing of the invention. The oil compounds with, or extends the synthetic rubber to soften it and provide a usable material which can be used, for example, as a master batch for blending with any suitable rubber batches or materials, and be processed by usual rubber working apparatus. Thus an improved, softened and usable synthetic rubber has been obtained by the process of the invention from a scrap material so that it is believed that the objects of the invention have been achieved.

While one complete embodiment of the invention has been disclosed herein, it will be appreciated that modifications of this particular embodiment of the invention may be resorted to without departing from the scope of the invention as defined in the appended claims.

What is claimed is:

1. A method of treatment of scrap synthetic polymeric materials containing large amounts of water therein to soften and render usable such polymer material comprising the steps of immersing polymer particles in a rubber compounding oil, heating the rubber compounding oil to about 350° to 420° F. to heat the polymer particles immersed therein to above 212° F., completely submerging the polymer particles in the rubber compounding oil while it is being heated to eliminate oxidation of the polymer particles as the heating of the polymer particles causes the water contained therein to be released and boiled off, the heating of the polymer particles also facilitating combination of at least some of the rubber compounding oil with the polymer particles, and removing the polymer particles from the heated compounding oil to obtain a softened usable product.

2. A method for the treatment of relatively tough scrap GRS rubbers such as a butadiene-styrene copolymer residue formed from a latex of polymer particles prepared for use in latex form comprising the steps of immersing the polymer particles in a rubber compounding oil, heating the rubber compounding oil to about 350° to 420° F. to heat the polymer particles to above 212° F., and completely submerging the polymer particles in the heated rubber compounding oil to boil off at least part of the water from the polymer particles without causing oxidation thereof, at least some of the rubber compounding oil combining with the polymer particles by such action.

3. A method as in claim 2 wherein a naphthenic rubber compounding oil is used and where about 20 to 40 percent by weight of the oil in relation to the weight of the scrap rubber processed is combined therewith.

4. A method for the treatment of relatively hard or tough polymeric materials formed by polymerization in an aqueous medium for removing water contained therein and for softening the polymer particles comprising the steps of placing a plurality of polymer particles on a moving member, passing the moving member with the polymer particles thereon through a bath of rubber compounding oil heated to a temperature appreciably above 212° F., to heat the polymer particles whereby water contained therein is released and boiled off, the heating of the polymer particles causing some of the rubber compounding oil to combine with the polymer particles, and maintaining the polymer particles completely immersed in the bath of rubber compounding oil as substantially all of the water contained in the polymer particles is boiled off to avoid oxidation of said polymer particles.

5. The method according to claim 4 and including the step of periodically adding additional quantities of said rubber compounding oil to the bath in order to selectively control the poundage of rubber compounding oil used in the immersion process.

6. The method according to claim 4 wherein the degree of softness of the polymer treated by the process steps is dependent upon the specific type of rubber compounding oil used, the poundage of rubber compounding oil used, the temperature of the bath, and the time length of immersion of the polymer in the bath.

7. A method for the treatment of relatively tough scrap polymeric materials, such as those obtained from a latex of a GRS rubber produced by polymerization in an aqueous medium, comprising the steps of passing the polymer particles through a bath of rubber compounding oil comprised of aromatic, naphthenic, and paraffinic carbon groups heated to a temperature appreciably above 212° F. at a speed as to retain the polymer particles in the rubber compounding oil for a sufficient time to boil at least part of the water therefrom and to combine some of the rubber compounding oil with the polymer particles, and maintaining the polymer particles completely immersed in the bath of compounding oil, as the water contained in the polymer particles is boiled off.

8. A method for the treatment of scrap polymeric materials, such as a GRS butadiene-styrene copolymer formed from a latex of such polymeric materials prepared for use in latex comprising the steps of placing a plurality of polymer particles in a bath of naphthenic rubber compounding oil, heating the compounding oil to a temperature appreciably above 212° F., whereby the polymer particles immersed therein are also heated to effect combination of some of the compounding oil with the polymer particles, the heating of the polymer particles also causing the water contained therein to be boiled off, and maintaining the polymer particles completely immersed in the bath of compounding oil as such heating takes place.

9. A method for the treatment of masses of scrap polymeric materials, formed by polymerization in an aqueous medium and containing water, for removing the water and for softening the polymer comprising the steps of placing the polymer masses in a bath of rubber compounding oil comprised of aromatic, naphthenic, and paraffinic carbon groups and heated to a temperature above 212° F. to boil water from the polymer and to cause at least some of the oil to combine with the polymer, and maintaining the polymer completely immersed when in the bath of rubber compounding oil, the amount of water driven from the polymer depending upon the time of immersion and the temperature of the rubber compounding oil as well as the size and texture of the polymer masses.

10. A method for the treatment of scrap polymeric particles such as those obtained from a latex of a synthetic rubber produced by polymerization in an aqueous medium, comprising the steps of immersing a polymer particle in a rubber compounding oil comprised of aromatic, naphthenic, and paraffinic carbon groups that is heated to above 212° F. to boil off the water from the polymer particle and to combine some oil with the polymer particle, and removing the polymer particle from the heated compounding oil to obtain a softened product.

References Cited by the Examiner

UNITED STATES PATENTS 2,460,582  2/1949  Japs _____ 260—33.6
2,978,427  4/1961  Pullar et al. _____ 260—33.6

MORRIS LIEBMAN, *Primary Examiner.*

J. S. WALDRON, S. L. FOX, *Assistant Examiners.*